UNITED STATES PATENT OFFICE.

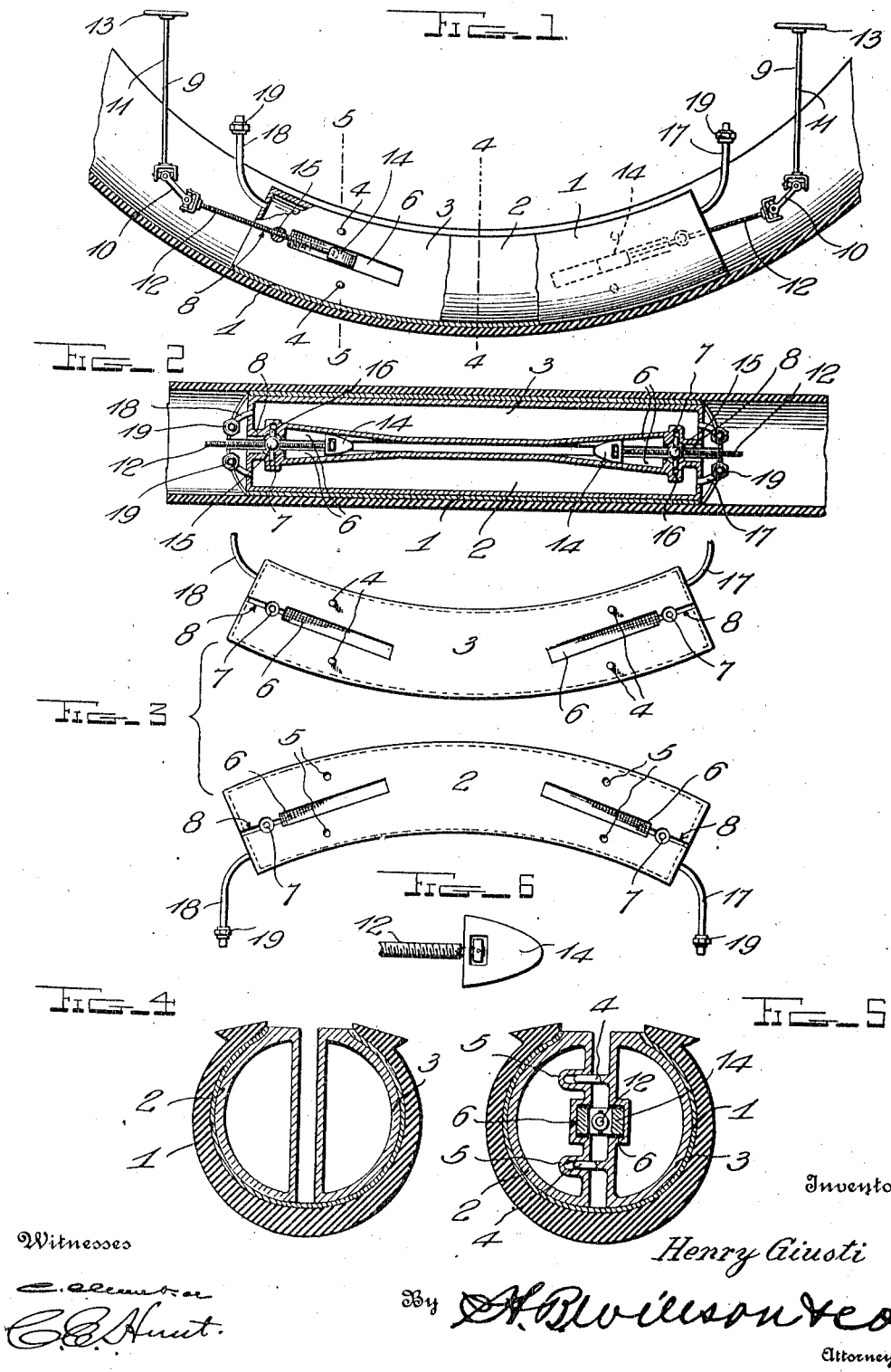

HENRY GIUSTI, OF FRANKFORD, PENNSYLVANIA.

VULCANIZING DEVICE.

1,081,824.   Specification of Letters Patent.   Patented Dec. 16, 1913.

Application filed January 23, 1913. Serial No. 743,835.

*To all whom it may concern:*

Be it known that I, HENRY GIUSTI, a citizen of the United States, residing at Frankford, in the county of Philadelphia and State of Pennsylvania, have invented certain new and useful Improvements in Vulcanizing Devices; and I do declare the following to be a full, clear, and exact description of the invention, such as will enable others skilled in the art to which it appertains to make and use the same.

This invention relates to improvements in vulcanizing devices and particularly to devices for vulcanizing rubber tires.

One object of the invention is to provide a vulcanizing device of this character having an improved construction and arrangement of expansible heat applying members and means whereby the latter may be readily expanded to the desired extent within the tire or other object to be vulcanized.

Another object is to provide a vulcanizing device of the character described which will be simple, strong, durable and inexpensive in construction, efficient and reliable in operation and well adapted to the purpose for which it is designed.

With these and other objects in view, the invention consists of certain novel features of construction, and the combination and arrangement of parts as will be more fully described and claimed.

In the accompanying drawings: Figure 1 is a vertical longitudinal section of a portion of the tire showing the application of my improved vulcanizing device, parts of the latter being broken away and in section; Fig. 2 is a longitudinal sectional view of the device; Fig. 3 is a plan view of the inner sides of the two heat applying devices of the apparatus; Fig. 4 is a cross sectional view of the device and of the tire to which the same is applied taken on the line 4—4 of Fig. 1; Fig. 5 is a similar view taken on the line 5—5 of Fig. 1; Fig. 6 is a detail view of the inner end or head of one of the expanding members of the device.

My improved vulcanizing device comprises an outer segmental shell or casing 1 which is preferably formed of thin flexible metal and which has a cross sectional shape corresponding substantially to the shape of the inner surface of the tire or other object to which the device is to be applied. The sides of the shell or casing 1 terminate some distance from each other and thus provide between the upper edges of said sides a longitudinal space which is increased to a greater or less extent when the sides of the shell or casing are expanded in the tire in a manner hereinafter described.

Arranged in the shell or casing 1 are two counter-part hollow segmental heat applying members 2 and 3 each of which is of substantially semi-circular shape in cross section and are preferably formed of sheet metal. The members 2 and 3 are closed on all sides and at their ends to form fluid-tight containers for a heating fluid which is supplied thereto in a manner hereinafter described. The members 2 and 3 are arranged side by side in the shell or casing 1 with their flat sides adjacent to and opposing each other as shown. The members when thus arranged are held in alinement and in parallel relation by means of guide studs 4 which are secured to the flat inner side of the member 3 and are adapted to be engaged with sockets 5 formed in the adjacent side of the member 2 as clearly shown in Figs. 3 and 5 of the drawings.

In the flat sides of the members 1 and 2 near each end thereof are formed longitudinal recesses or channels 6 which incline from the outer ends of the members toward each other as shown. The inner walls of the recesses or channels 6 taper or incline from the outer toward the inner ends thereof as clearly shown in Fig. 2 of the drawings. The recesses or channels in the ends of the opposing members are arranged in line or directly opposite each other and are provided to receive expanding devices hereinafter described. In the opposite flat sides of the members 2 and 3 adjacent to the outer ends of the channels or recesses 6 are formed sockets 7 and in said flat sides of the members between the outer ends of the channels or recesses 6 and the outer ends of the members are formed longitudinal grooves 8 which are intersected by the sockets 7.

The expanding mechanism for the heat applying members 2 and 3 comprises flexible adjusting rods 9 which are arranged at and project between the ends of the members 2 and 3. The rods 9 are formed in sections connected by universal joints 10 as shown. The outer sections 11 of the rods extend inwardly at substantially right angles to the inner sections 12 and said outer sections have on their outer ends hand wheels 13 whereby the rods are operated. The inner sections 12 of the rods are threaded and project between the flat sides of the members 2 and 3 and when the flat sides of said members are in engagement, said inner sections of the rods lie in the grooves 8 in said flat inner sides of the members. The threaded sections 12 of the rods have swiveled on their inner ends tapered or substantially triangular shaped expanding heads 14 which are slidably engaged with the channels or recesses 6 in the flat sides of the members 2 and 3. When thus arranged the tapered edges of the heads 14 engage the inclined inner walls of the recesses or channels 6 whereby when the heads 14 are forced inwardly the heat applying sections 2 and 3 will be forced apart or expanded in the shell or casing 1 which, owing to its flexible construction is also expanded by the heads 14. The threaded ends of the rods 12 have an operative engagement with nuts 15 on the opposite sides of which are formed laterally extending studs 16 which are engaged with the sockets 7 in the flat sides of the members 2 and 3 whereby said nuts are held in position to receive the threaded ends of the rods 12 which when turned in the proper direction are screwed inwardly through said nuts, thus projecting the heads 14 into the recesses 6 which will expand or spread the members 2 and 3 in the manner described. When the rods 9 are turned in the reverse direction, the expanding heads 14 will be retracted thereby permitting the heat applying members 2 and 3 to contract and come together to facilitate the disengagement of the device from the tire.

Connected to each end of the heat applying members 2 and 3 are short steam inlet and discharge tubes 17 and 18 having on their outer ends couplings 19 to which steam conducting and discharging tubes (not shown) may be connected for supplying the members 2 and 3 with steam to provide heat which is applied by said members to the inner side of the tire or other object with which the device is engaged.

In the operation of the device, the heat applying members 2 and 3 are engaged with the shell or casing 1 and the expanding device placed between said members, after which the shell and expanding members are inserted in the tire or other object to be vulcanized. After these parts have been thus applied to the inner side of the tire the latter is placed in a mold of the usual or any suitable construction. The expanding rods 9 are now turned in the proper direction for projecting the expanding heads inwardly in the recesses 6, thus expanding or spreading said members and the shell or casing outwardly in the tire and tightly clamping the latter in the mold. After the portion of the tire to be vulcanized has thus been clamped in the mold the steam or other heating fluid is turned into one end of the heat applying members 2 and 3 and circulates through the same and is discharged from the opposite ends thereof. The heat thus supplied to the members 2 and 3 is applied by the latter through the shell or casing 1 to the inner surface of the portion of the tire with which said members are engaged. When the vulcanizing operation has been completed, the steam may be cut off and the expanding rods turned in the proper direction to permit the heat applying members to contract or come together in the manner described, thus permitting the device to be shifted to another part of the tire or to be readily removed therefrom.

From the foregoing description taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of the invention as claimed.

Having thus described my invention, what I claim is:—

1. In a vulcanizing device, a shell or casing, a pair of hollow heat applying members engaged with said casing, said members having in their adjacent surfaces inclined recesses, nuts secured in the opposing faces of said members, threaded expanding rods engaged with said nuts, tapered expanding heads on the inner ends of said rods to engage the inclined recesses in the opposing sides of said heat applying members whereby when said rods are turned in the proper direction for projecting said heads, said members will be expanded in said shell or casing and the latter expanded in the tire or other object to be vulcanized.

2. In a vulcanizing device, an outer shell or casing open along its inner side, hollow fluid-tight expanding members arranged in said shell or casing, steam inlet and discharge tubes connected with the opposite ends of said members, coupling devices arranged on said tubes, nuts secured between the opposing sides of said heat applying members, threaded expanding rods having an operative engagement with said nuts, said rods being formed in a series of flexibly connected sections, operating devices on the outer sections of said rods, and tapered expanding heads having a swiveled connection with the inner ends of said rods whereby when the latter are turned in the proper direction, said heat applying members are expanded.

3. In a vulcanizing apparatus, an outer shell or casing open along its inner side, hollow fluid-tight counter-part heat applying members arranged in said shell or casing, said members having flat inner opposing sides provided with longitudinal tapered or inclined recesses, longitudinal grooves and nut receiving sockets, nuts having thereon laterally extending studs engaged with said sockets whereby said nuts are held in position between said heat applying members, flexible expanding rods having threaded inner sections operatively engaged with said nuts, and tapered expanding heads swiveled on the inner ends of said threaded inner sections of the rods and having an operative engagement with said tapered recesses whereby when the rods are turned in the proper direction for projecting and retracting said heads, said heat applying members will be expanded and permitted to contract, and studs arranged on the inner side of one of said heat applying members and adapted to be engaged with the adjacent side of the opposing member whereby said members are held in alinement.

In testimony whereof I have hereunto set my hand in presence of two subscribing witnesses.

HENRY GIUSTI.

Witnesses:
L. O. HILTON,
M. H. STUARD.